US012622356B2

(12) United States Patent
Miller et al.

(10) Patent No.: US 12,622,356 B2
(45) Date of Patent: May 12, 2026

(54) SELF-PROPELLED HARVESTER INCLUDING AN ADAPTER UNIT DETACHABLY POSITIONED BETWEEN A MOUNTING DEVICE AND AN ATTACHMENT

(71) Applicant: CLAAS Omaha Inc., Omaha, NE (US)

(72) Inventors: Christopher Miller, Lincoln, NE (US); Seth Zentner, Johnson, NE (US); Kevin Wilkening, La Vista, NE (US)

(73) Assignee: CLAAS Omaha, Inc., Omaha, NE (US)

( * ) Notice: Subject to any disclaimer, the term of this patent is extended or adjusted under 35 U.S.C. 154(b) by 663 days.

(21) Appl. No.: 17/994,191

(22) Filed: Nov. 25, 2022

(65) Prior Publication Data

US 2024/0172591 A1     May 30, 2024

(51) Int. Cl.
| | |
|---|---|
| *A01D 43/08* | (2006.01) |
| *A01D 41/14* | (2006.01) |
| *A01D 41/16* | (2006.01) |
| *A01F 29/09* | (2010.01) |

(52) U.S. Cl.
CPC ......... *A01D 43/085* (2013.01); *A01D 41/142* (2013.01); *A01D 41/16* (2013.01); *A01F 29/095* (2013.01)

(58) Field of Classification Search
CPC .... A01D 43/085; A01D 41/142; A01D 41/16; A01D 41/02; A01D 29/095
USPC ...................................................... 56/DIG. 9
See application file for complete search history.

(56) References Cited

U.S. PATENT DOCUMENTS

| | | | | |
|---|---|---|---|---|
| 3,638,407 A | * | 2/1972 | Togami ................. | A01D 41/16 56/208 |
| 4,061,284 A | * | 12/1977 | Raisbeck ............... | A01F 29/06 241/222 |
| 4,218,864 A | * | 8/1980 | Allemeersch ........ | A01D 41/142 56/11.8 |
| 4,266,395 A | * | 5/1981 | Basham ............... | A01D 75/287 56/16.2 |
| 4,286,423 A | * | 9/1981 | Caldwell ............. | A01D 34/661 56/13.6 |
| 5,557,912 A | * | 9/1996 | Voss ...................... | A01D 41/06 56/130 |
| 6,050,075 A | * | 4/2000 | Waldrop ............. | A01D 89/005 56/364 |

(Continued)

FOREIGN PATENT DOCUMENTS

| | | | | | |
|---|---|---|---|---|---|
| CA | 2940484 C | * | 6/2018 | ............. | A01D 41/16 |
| DE | 102004031514 B3 | * | 11/2005 | ........... | A01D 34/283 |

(Continued)

*Primary Examiner* — Joseph M Rocca
*Assistant Examiner* — Sunny D Webb
(74) *Attorney, Agent, or Firm* — Lempia Summerfield Katz LLC

(57)     ABSTRACT

A self-propelled harvester is disclosed. The self-propelled harvester includes a mounting device, which has a feed means for harvested material, for mounting an attachment on the harvester. An adapter unit may be detachably arranged between the mounting device and the attachment, such that the adapter unit is designed to couple the attachment to the mounting device. Further, the adapter unit may be configured to adjust an inclination of the attachment with respect to the mounting device in the longitudinal direction and in the transverse direction.

23 Claims, 10 Drawing Sheets

(56)     References Cited

U.S. PATENT DOCUMENTS

| | | | | |
|---|---|---|---|---|
| 6,510,680 | B2 * | 1/2003 | Uhlending | A01D 75/287 |
| | | | | 56/16.2 |
| 6,826,894 | B2 * | 12/2004 | Thiemann | A01D 41/141 |
| | | | | 701/50 |
| 7,552,578 | B2 * | 6/2009 | Guske | A01B 71/063 |
| | | | | 56/16.3 |
| 8,322,122 | B2 * | 12/2012 | Dold | A01D 41/142 |
| | | | | 56/15.6 |
| 8,376,126 | B1 * | 2/2013 | Waerdt | A01D 41/16 |
| | | | | 198/780 |
| 10,743,467 | B2 * | 8/2020 | Dorhout | A01D 45/02 |
| 2016/0165796 | A1 * | 6/2016 | Carpenedo | A01D 41/16 |
| | | | | 56/14.7 |

FOREIGN PATENT DOCUMENTS

| | | | | | |
|---|---|---|---|---|---|
| DE | 102020119291 | A1 * | 1/2022 | | A01D 43/085 |
| EP | 4144204 | A1 * | 3/2023 | | A01D 41/16 |

* cited by examiner

SELF-PROPELLED HARVESTER INCLUDING AN ADAPTER UNIT DETACHABLY POSITIONED BETWEEN A MOUNTING DEVICE AND AN ATTACHMENT

TECHNICAL FIELD

The present invention relates to a self-propelled harvester.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

U.S. Pat. No. 8,322,122, incorporated by reference herein in its entirety, discloses a self-propelled harvester designed as a forage harvester, which may include an adapter unit for coupling an attachment designed as a mowing attachment for a combine to a mounting device designed as a feed channel, which may be detachably connected to the mounting device and the attachment.

DE 20 2007 011 411 U1 discloses an adapter unit that is configured to attach an attachment for a combine to a forage harvester. The adapter unit may have a conveyor feed roller designed as a screw conveyor for conveying harvested material, which has been collected by the attachment, into the mounting device. The screw conveyor may serve to bring the flow of harvested material together into the center before the flow of harvested material exits the adapter unit and may be grasped by a feed means arranged in the mounting device; in the case of a forage harvester, the feed means may be designed as feed rollers.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
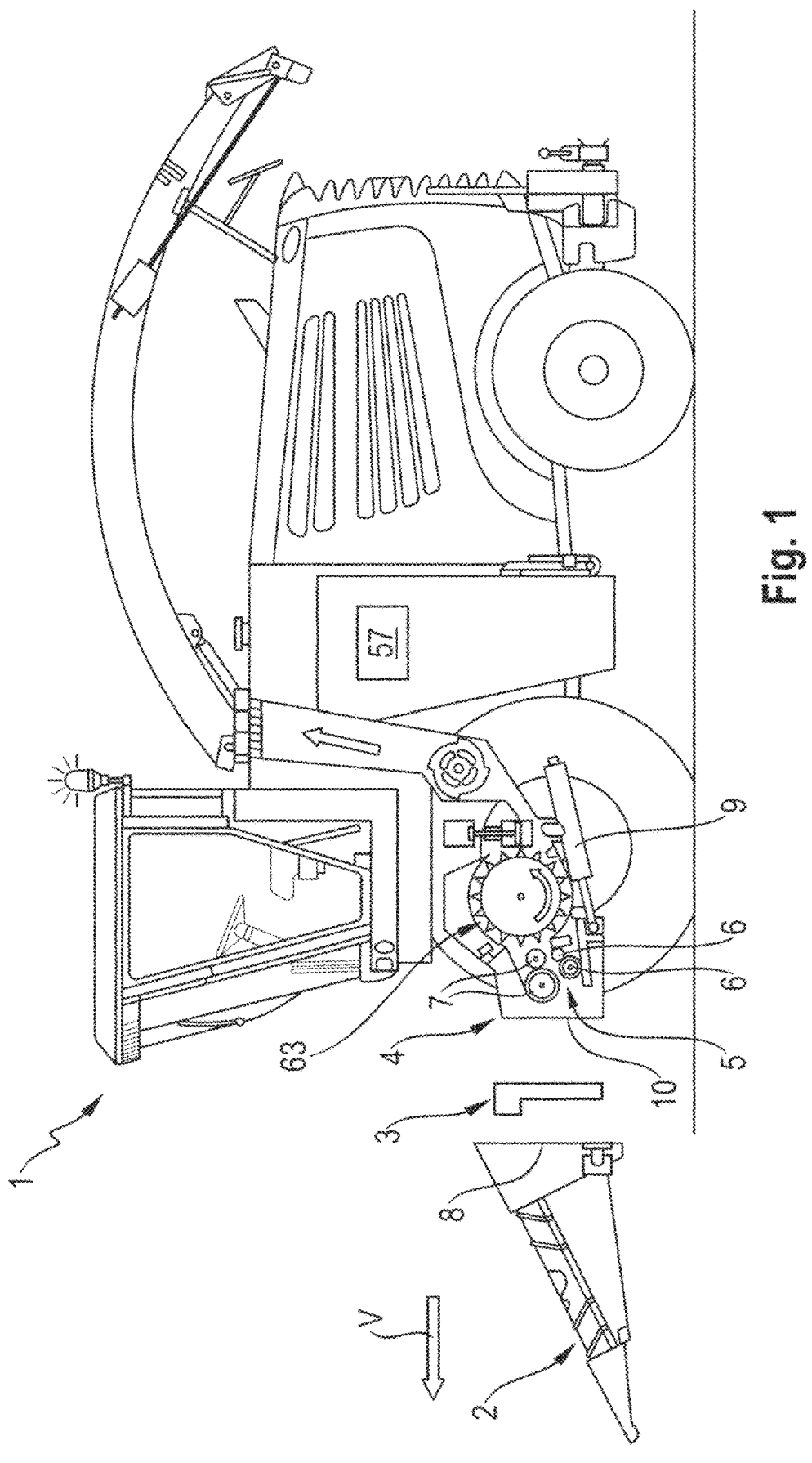
FIG. 1 shows a schematic representation of a harvester in a side view with an attachment and an adapter unit.

As discussed in the background, an adapter unit, which may include a screw conveyor to convey the harvested material into a center (or a central area or a middle area), may be used as an attachment for a combine to a forage harvester. Aggressively gathering the harvested material in the middle of the adapter unit may result in supply problems occurring when a working unit is downstream from the feed means. This may be due to higher pressures and an increase in friction in the adapter unit, which may result in a deterioration in the delivery rate of crop. In turn, the deterioration of the harvested material delivery rate may reduce the amount of harvested material that can be transported through the adapter unit to the mounting device in order to supply it to the downstream working unit. This may result in a reduced harvesting speed and therefore a reduced efficiency of the harvesting process. Furthermore, this concentration on the center (or other central area) may result in uneven wear on the downstream working unit. In the case of a forage harvester, the downstream working unit may be a chopping device on which uneven blade wear may occur.

Thus, in one or some embodiments, a forage harvester is disclosed so that attachments may be coupled to the mounting device in such a way that they may follow a change in ground contours without modification of the mounting device.

In one or some embodiments, a self-propelled harvester is disclosed comprising a mounting device having a feed means (e.g., a feeder) configured to feed harvested material into and/or within the harvester and configured to mount an attachment on the harvester. The harvester further includes an adapter unit that is detachably arranged or positioned between the mounting device and the attachment. In one or some embodiments, the adapter unit is designed to couple the attachment to the mounting device, wherein the adapter unit is configured to adjust an inclination of the attachment relative to the mounting device in the longitudinal direction and/or in the transverse direction (e.g., adjust an inclination of the attachment relative to the mounting device in the longitudinal direction and/or in the transverse direction relative to a forward direction of travel of the harvester).

In one or some embodiments, the adjustability of the inclination of the attachment in longitudinal direction and/or transverse direction to the adapter unit may have the advantage that no adaptation of the mounting device of the self-propelled harvester is required in order to be able to couple attachments, the operation of which is more efficient due to the adaptation to changing ground contours by the adjustability of the inclination of the attachment in longitudinal and transverse direction. When harvesting crops where the grains are close to the ground such as soybeans, the angle of cut, which may be adjusted by adapting the longitudinal tilt, may be very important to reduce loss of grain. For standing crops such as corn, adapting the longitudinal tilt allows the attachment to tilt rearward, which may improve harvesting efficiency and may reduce the loss of ears of corn, especially at higher harvesting speeds. Adapting the tilt in the transverse direction may allow for improved crop pick-up.

In one or some embodiments, the adapter unit may comprise a stationary frame element arranged or positioned on the mounting device and a frame element (interchangeably termed a relatively-movable frame element) movable relative to the stationary frame element. In one or some embodiments, the stationary frame element may be releasably fixed to the mounting device. For adjusting the inclination of the attachment in the longitudinal and transverse directions, the relatively movable frame element, on which the attachment is arranged, positioned, or connected, is movable relative to the stationary frame element and therefore to the mounting device. In one or some embodiments, the stationary frame element has a substantially cuboidal through-hole, while the relatively movable frame element has a substantially trapezoidal through-hole. In particular, the trapezoidal through-hole may exhibit a course widening from the bottom to the top. In one or some embodiments, the trapezoidal through-hole of the relatively movable frame element may have an opening cross-section substantially corresponding to that of the outlet opening in the frame of the attachment. This may avoid additional compaction while picking up the harvested material supplied from the attachment upon entering the adapter unit. Avoiding additional compaction of the harvested material may mean that the occurrence of higher pressures and an increase in friction in the adapter unit may be avoided or at least reduced, which may have a positive effect on the onward conveyance of the harvested material.

In particular, the adapter unit may comprise a driven intermediate conveyor which may be arranged or positioned on the stationary frame element between an outlet opening of the attachment and the mounting device (e.g., an opening in the mounting device). Using the intermediate conveyor, harvested material coming from the attachment and conveyed through the outlet opening into the adapter unit may be actively passed on to the feed means (e.g., the feeder) of the mounting device. In this way, the risk of a material jamming may be avoided or at least reduced. Thus, in one or some embodiments, the intermediate conveyor may convey, promote, or result in an undershot (e.g., to shoot short of and/or below a respective target).

In one or some embodiments, the relatively movable frame element may be designed or configured to be adjustable in the transverse direction about a virtual pendulum axis running in the longitudinal direction of the mounting device, and/or in the longitudinal direction about a horizontal pivot axis arranged on the stationary frame element and running transversely with respect to the longitudinal axis of the mounting device.

Furthermore, in one or some embodiments, the relatively movable frame element may sectionally enclose the stationary frame element in the region of the pivot axis. Enclosing the stationary frame element only in the region of the pivot axis may have the advantage that the adjustment of the inclination in the longitudinal direction is possible over a wide angular range. Therefore, the attachment may be pivoted upwards toward the harvester as well as downwards toward the ground. The relatively movable frame element may also form an enlarged contact surface for the attachment to be arranged thereon, in order to securely receive and support the attachment.

In order to bring about guidance of the relatively movable frame element during an adaptation of the inclination in the transverse direction (e.g., an oscillation about the virtual pendulum axis), at least two rollers may be arranged or positioned opposite one another on the relatively movable frame element in the outer edge region, which rollers may be supported on correspondingly designed guide elements arranged or positioned on the stationary frame element.

In one or some embodiments, at least one actuator may be provided for adjusting the inclination of the attachment relative to the mounting device in the longitudinal direction. For adjusting the inclination in the longitudinal direction, the actuator may be designed or configured to comprise at least one hydraulic cylinder. A control unit may be included on one or both of the harvester or the attachment for actuating the at least one actuator in order to adjust the inclination in one or more directions (such as in the longitudinal direction).

In one or some embodiments, the adaptation of the inclination of the attachment relative to the mounting device in the transverse direction may be carried out passively. For this purpose, ground sensing means may be included, one example of which may comprise one or more support wheels (which may further include one or more sensors) arranged or positioned on the outside of the attachment, which may sense and/or follow the ground contour. The attachment may thus oscillate freely about the virtual pendulum axis using the relatively movable frame element.

In one or some embodiments, the longitudinal inclination may be adjustable within a range substantially between ±4°, and the transverse inclination may be adjustable within a range substantially between ±4.5°. The tilt control of the attachment in the longitudinal direction may be advantageous because it may allow for optimization of the angle between the attachment and the ground under different or varying harvesting conditions. For example, the attachment may be tilted rearward when the crop is standing tall to improve crop pickup. In addition, tilting the attachment rearward allows for greater clearance underneath the harvester when the attachment is loaded onto a transport trailer for transport. In this regard, in one embodiment, the harvesting condition(s) may be input (e.g., input via an operator of the harvester or automatically input via a sensor configured to sense the harvesting condition(s)). Responsive to input of the harvesting condition(s), the attachment may be tilted accordingly. When the harvested material is lying down (or substantially horizontal), the header may be tilted forward for more aggressively picking up the harvested material. In principle, different values for the range of inclination of the relatively movable frame element in the longitudinal direction and in the transverse direction, a larger or a smaller value, are contemplated.

In particular, in one or some embodiments, the adapter unit may have a feed floor extending below the intermediate conveyor and formed between a delivery area in front of the outlet opening of the attachment, and a receiving area below the feed means with a substantially stepless transition, or a transition adapted to the inclination of the delivery area and the receiving area due to the design. The geometrically adapted feed floor may prevent the flow of harvested material from making a steep transition upwardly through the adapter unit, or striking the feed means of the mounting device of the harvester at an incorrect angle, which may cause problems with the supply of harvested material. Geometrically adapting the feed floor may allow the heights and angles of the feed floor to be improved or optimum for a uniform (or substantially uniform) flow of harvested material through the adapter unit and delivery to the feed means of the mounting device. The transitions from the attachment to the adapter unit and from the adapter unit to the feed means may also be designed to provide a substantially uniform flow of harvested material.

In one or some embodiments, the distance between the enveloping circle of the intermediate conveyor and the feed floor of the mounting device may be reduced or minimized. For this purpose, the paddle drum may have an envelope circle diameter such that the distance to the feed bottom of the adapter unit is reduced or minimized. Reducing or minimizing the distance of the intermediate conveyor, or free outer ends of paddle elements arranged distributed on the intermediate conveyor in the circumferential direction, to the feed floor may allow the space below the intermediate conveyor, within which the harvested material is grasped and conveyed to a lesser extent by the intermediate conveyor, to be reduced or minimized.

In one or some embodiments, the intermediate conveyor may be floatingly mounted. By floating the intermediate conveyor, it is possible to react or respond to volume fluctuations in the flow of harvested material supplied by the attachment (e.g., the intermediate conveyor may be configured to float by being adjustable responsive to volume fluctuations in flow of the harvested material supplied by the attachment). The intermediate conveyor may thereby perform an upward compensating movement when an increased amount of harvested material is supplied, and/or a downward compensating movement when the amount of harvested material decreases. Fluctuations in crop density therefore may not lead to additional compaction or worsening conveying behavior by the intermediate conveyor.

For this purpose, a drive shaft of the intermediate conveyor may be sectionally pivotable in a substantially vertical direction about opposing articulation points arranged on side walls of the stationary frame element. On the opposing side walls of the stationary frame element, arced recesses or elongated holes may be provided within which the drive shaft of the intermediate conveyor is movable.

In particular, the drive speed of the intermediate conveyor may be variably adaptable to the drive speed of the feed means and/or a downstream working unit of the harvester. A working unit of the harvester downstream of the feed means may be a chopping device of a forage harvester. In order to achieve a desired (e.g., an optimum) chopping length or chopping quality, the drive speed of the chopping device may be variably preset and may also be adjusted during the chopping process. The variable adaptability of the drive speed of the intermediate conveyor makes it possible to control or regulate it in such a way that the drive speed of the intermediate conveyor may follow, such as directly, a change in the drive speed of the feed means and/or the downstream working unit. In this way, an optimal supply of the harvested material by the intermediate conveyor may be achieved.

For this purpose, in one or some embodiments, it may be advantageous to drive the intermediate conveyor independently of the attachment and the feed means.

In one or some embodiments, the intermediate conveyor may be driven directly or indirectly by a hydraulic motor. In particular, the intermediate conveyor may be driven by the hydraulic motor independently of the drive means of the attachment. For an indirect drive of the intermediate conveyor, a first sprocket arranged or positioned on the output shaft of the hydraulic motor and a second sprocket arranged on the drive shaft of the intermediate conveyor may be provided, which may be looped by an endless circulating chain. These may form a stage of a chain drive. The chain drive may also be designed two-stage, wherein the hydraulic motor drives the drive shaft or input shaft of the first stage. A second sprocket of the first stage may then drive the first sprocket of the second stage which drives the intermediate conveyor. A chain tensioner may apply a predeterminable force to the first stage chain to follow the substantially vertical deflection of the floating intermediate conveyor while maintaining the required chain tension. In one or some embodiments, the intermediate conveyor may be driven directly by the hydraulic motor.

Alternatively, the hydraulic drive may be arranged on the drive shaft of the intermediate conveyor for directly driving the intermediate conveyor. This may simplify the design of the drive train for driving the intermediate conveyor.

A significant advantage of driving of the intermediate conveyor by the hydraulic motor is that the hydraulic motor may operate the intermediate conveyor in a stepless speed range between a minimum value and a maximum value. The drive speed of the intermediate conveyor may therefore be flexibly adapted to changes in different supply characteristics of attachments and/or different harvesting conditions. In particular, when the intermediate conveyor is driven indirectly, it is not necessary to replace the sprockets of the first stage or the sprockets of the second stage of the chain drive in order to adapt the speed of the intermediate conveyor or the paddle drum.

In particular, a control unit may be assigned to the adapter unit, which may be configured to actuate the hydraulic drive. In one or some embodiments, the control unit may be arranged or positioned on the adapter unit or on the harvester. Alternatively, or in addition, the control unit may be operated from an operator's cab of the harvester using an input-output unit. In one or some embodiments, the control unit may be configured to actuate additional actuators and/or working units of the adapter unit and/or the harvester. Furthermore, at least one sensor may be arranged or positioned on the adapter unit, which may be configured to detect a deflection of the floating intermediate conveyor. Signals generated by the at least one sensor may be transmitted to the control unit for evaluation. By evaluating the signal of the at least one sensor, the control unit may determine the amount of harvested material which is fed to the intermediate conveyor and, depending thereupon, adapt the rotational speed of the intermediate conveyor or the paddle drum, respectively (e.g., depending on the determined amount of harvested material, the control unit may send a signal or a command to control the rotational speed of the of the intermediate conveyor or the paddle drum). In this regard, the control unit may receive an indication of the deflection of the intermediate conveyor, and in response to receiving the indication, control a rotational speed of the intermediate conveyor by actuating the hydraulic drive based on the indication of the deflection of the intermediate conveyor.

Alternatively or in addition, the control unit may be configured to adapt the speed of the intermediate conveyor by actuating the hydraulic drive as a function of the evaluation of the signals provided by the at least one sensor. In this way, it is possible to react flexibly to changing harvesting conditions, such as react to fluctuations in the supplied mass flow, whereby faults such as the occurrence of a jam of material may be avoided.

In one or some embodiments, an angular gear may be arranged or positioned on the stationary frame element (e.g., positioned below the intermediate conveyor). In one or some embodiments, the angular gear may comprise two coaxial output shafts, which may serve to drive two gearboxes arranged opposite each other on the stationary frame element. The two gearboxes may form the drive means of the components of the attachment coupled to the adapter unit. Other drive means are contemplated, including different numbers of gearboxes. Due to the arrangement on the stationary frame element, the position of the two gearboxes may remain unchanged when the inclination is adapted or adjusted in the longitudinal and/or transverse direction of the attachment.

In this case, the gearboxes may each be arranged in a housing which, starting from the output shafts of the angular gearbox, may extend substantially vertically in the direction of the intermediate conveyor, wherein an output shaft of the respective gearbox may extend outwards above and axially parallel to the output shafts of the angular gearbox. The elevated position of the output shaft of the particular gearbox may have the advantage that the range of movement necessary for the drive shafts of the attachment to compensate for changes in length and/or angle is increased due to the adjustable inclination in the longitudinal direction and in the transverse direction. This may counteract a limitation of the adjustment range for the inclination in the longitudinal direction and in the transverse direction without reducing the service life of the drive shafts of the attachment and associated couplings.

In one or some embodiments, the intermediate conveyor is designed as a paddle drum. The paddle drum may be characterized by paddles arranged over its lateral surface as exclusive conveying elements. The paddle drum may therefore avoid further compaction of the harvested material supplied by the attachment. This may mean that the occurrence of higher pressures and an increase in friction may be avoided or at least reduced, which may have a positive effect on the further conveying of the harvested material.

In one or some embodiments, the paddle drum may have carrier elements arranged or positioned in a plurality of rows one behind the other on its circumferential surface at a distance from one another in the axial direction, wherein the carrier elements arranged or positioned in rows may be offset from one another in the tangential direction. The offset arrangement may form a staggering of the carrier elements in the circumferential direction of the paddle drum. The paddle drum may comprise a substantially circular cylindrical hollow body which is non-rotatably arranged on a drive shaft. The carrier elements may extend sectionally in a radial direction beyond the circumferential surface of the hollow body. Wear plates may be detachably attached to the carrier elements. In one or some embodiments, the wear elements may be fastened to the carrier elements by screw connections. For this purpose, the carrier elements may have flat sections on which the wear elements are arranged. In the axial direction, the flat sections of the carrier elements may extend substantially axially parallel to the longitudinal axis of the paddle drum. In the radial direction, the flat sections of the carrier elements are inclined in the direction of rotation of the paddle drum. By the backward inclined arrangement of the carrier elements, or respectively the wear elements fixed thereon, an improved supply of the harvested material to the feed means of the mounting device may be achieved.

In one or some embodiments, at least one overhaul element detachably arranged or positioned on the paddle drum may be provided for disassembly of the paddle drum. By detaching the at least one overhaul element from the circumferential surface, the interior of the paddle drum may be made accessible to detach fasteners inside the paddle drum from the drive shaft. This may allow the paddle drum to be removed from the stationary frame element in which the paddle drum is mounted. This may be necessary, for example, to replace worn wear elements or to replace wear elements with wear characteristics adapted to the particular in harvested material being processed.

In this case, the at least one overhaul element may be detachably fastened to the paddle drum using an essentially cuboid base plate, such as by using screw connections. Depending on the spacing of the carrier elements in the axial direction and in the circumferential direction of the paddle drum, it may be provided that only at least one base plate is arranged or positioned on the circumferential surface of the paddle drum in order to enable accessibility of the interior of the paddle drum.

In one or some embodiments, the harvester may be designed as a self-propelled forage harvester, wherein the attachment to be coupled using the adapter unit is designed to be arranged on a self-propelled combine.

Referring to the figures, FIG. 1 illustrates a schematic representation of a harvester 1 in side view with an attachment 2 arranged or positioned thereon using an adapter unit 3. For better illustration, the attachment 2 and the adapter unit 3 are shown detached from each other. In one or some embodiments, the self-propelled harvester 1 may be designed as a forage harvester. The harvester 1 comprises a mounting device 4 for mounting the attachment 2. The mounting device 4 has a feed means 5 (alternatively termed a feeder) for harvested material which, in the case of the harvester 1 designed as a forage harvester, may be formed as one or more rollers, such as upper and lower feed rollers 6, 7 arranged in pairs, which may be arranged or positioned in a feed housing. In one or some embodiments, the attachment 2 may be designed as a so-called corn picker, which is usually used on a combine.

Harvested crop collected by the attachment 2 may be supplied to the feed rollers 6, 7 through a rear outlet opening 8 in the frame of the attachment 2 to a front opening 10 in the feed housing of the mounting device 4 and may be passed on for further processing to downstream working units of the harvester 1. The reference sign V denotes a forward direction of travel of the harvester 1, in which the harvested material is picked up. In one or some embodiments, the mounting device 4 may be pivotable by at least one hydraulic cylinder 9 about an axis of rotation extending horizontally and transversely to the forward travel direction V in order to be able to adjust the height of the attachment 2 relative to the ground.

To improve the nutrient content of animal feed, "ear corn" is increasingly being harvested rather than the whole corn plant. This means that only the corn cobs are harvested and processed into animal feed, rather than the whole plant. The specific function of a combine is to harvest only the corn cobs and process them through a threshing process. With the adapter unit 3 for attaching the attachment 2 of a combine, which may be designed for harvesting corn cobs, to a forage harvester as a harvester 1, the corn cobs may be harvested and brought into the forage harvester for processing. Similarly, small grain crops such as oats or wheat may be harvested using an attachment 2 which is normally used on a combine. With the adapter unit 3 for attaching the attachment 2 (designed for a combine) to the harvester 1 (designed as a forage harvester), the crop may be cut directly and fed to the harvester 1 for processing.

In this respect, the adapter unit 3 has the task of enabling the detachable mounting of the attachment 2 on the harvester 1. In addition, the adapter unit 3 may be configured to adjust an inclination of the attachment 2 with respect to the mounting device 4 in one or both of the longitudinal and/or transverse direction, in order to likewise enable the functions of adjusting the inclination of the attachment 2 in the longitudinal and/or transverse direction which are possible on a combine, irrespective of whether the harvester 1 is a combine or a forage harvester. Adjusting the inclination of the attachment 2 in the longitudinal and transverse directions may be advantageous in terms of maintaining the flow of harvested material and the efficiency in the process of picking up the crop using the attachment 2.

Figure 2B:
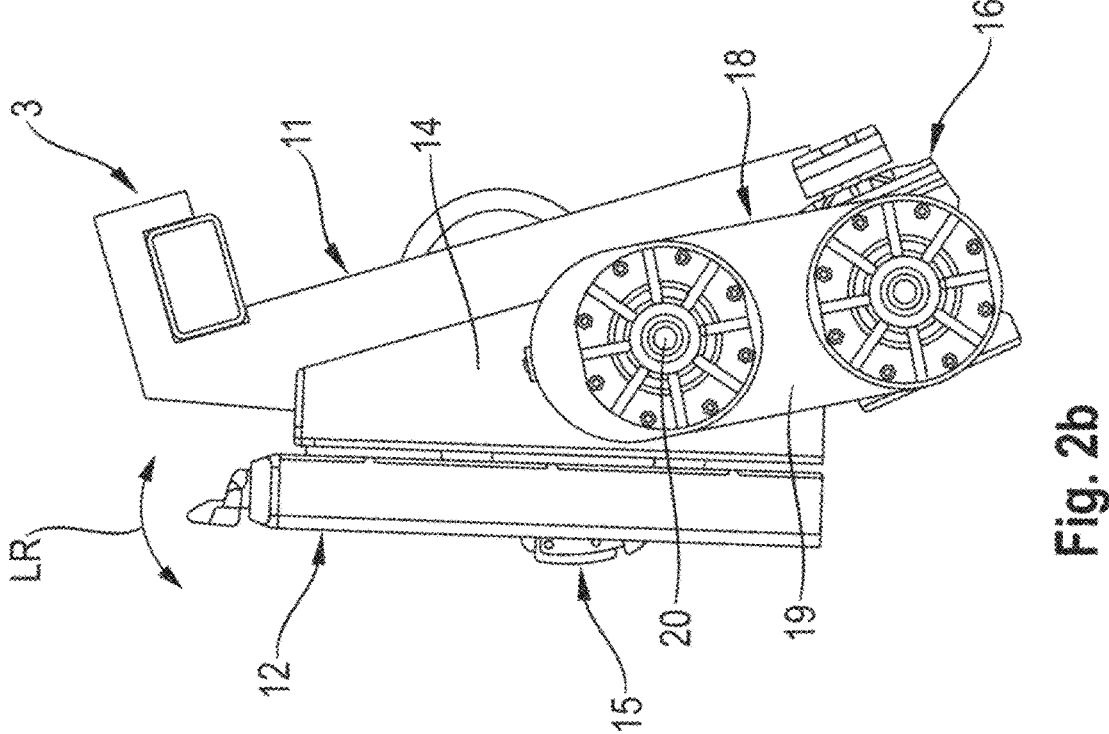
FIGS. 2*a-b* show schematic representations of the adapter unit in a side view in a first longitudinally inclined position in FIG. 2*a* and in a second longitudinally inclined position in FIG. 2*b;*
Figure 2A:
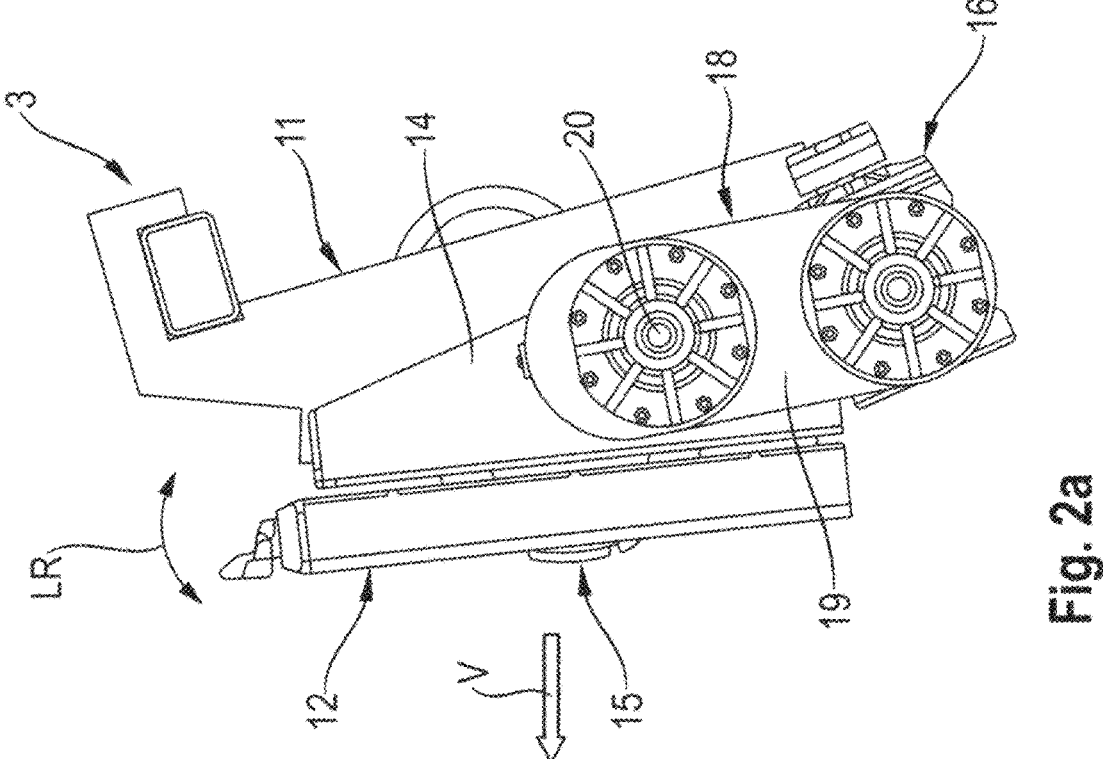

FIGS. 2a-b illustrate schematic representations of the adapter unit 3 in a side view in a first longitudinally inclined position in FIG. 2a, and in a second longitudinally inclined position in FIG. 2b. The adapter unit 3 may comprise a stationary frame element 11 arranged or positioned stationary on the mounting device 4, and a movable frame element 12 that is movable relative to the stationary frame element 11. "Stationary" may mean that the stationary frame element 11 is arranged or positioned immovably but releasably on the mounting device 4. In one or some embodiments, the relatively movable frame element 12 is designed to be adjustable relative to the stationary frame element 11 in the transverse direction QR (see FIG. 6) about a virtual pendulum axis 21 extending in the longitudinal direction of the mounting device 4, and about a horizontal pivot axis 13 extending transversely to the longitudinal axis of the mounting device 4 in the longitudinal direction LR. The inclination of the relatively movable frame element 12 may be adjustable in the longitudinal direction LR substantially within a predetermined range (e.g., a range between ±2°; a range between ±3°; a range between ±4°; a range between ±5°; etc.).

In FIG. 2B, the relatively movable frame element 12 has an inclination of 0° in the longitudinal direction LR relative to the stationary frame element 11. In this inclined position of the relatively movable frame element 12, the front side of the mounting device 4 and the rear outlet opening 8 in the frame of the attachment 2 enclose an angle determined by the design. This angle may ensure that the angle of inclination between the attachment 2 and the ground is optimal when the attachment 2 with the adapter unit 3 is attached to the harvester 1.

The variable adjustment of the inclination in the longitudinal direction LR may be advantageous because it allows improving or optimizing the angle between the attachment 2 and the ground under different harvesting conditions. For example, when the harvested material is high and stationary, the attachment 2 may be inclined towards the rear (e.g., towards the harvester 1) in order to make it easier for the attachment 2 to collect the harvested material. Furthermore, adjusting the inclination of the attachment 2 towards the rear may allow for greater clearance when the attachment 2 is to be loaded onto a transport trailer for transport. When the harvested material is lying on its side, the attachment 2 may be inclined more forward (e.g., towards the ground) to collect the harvested material more aggressively.

Furthermore, the illustrations in FIGS. 2a-b illustrate that the relatively movable frame element 12 sectionally encloses the stationary frame element 11 in the region of the pivot axis 13. For this purpose, the relatively movable frame element 12 has opposing side walls 14, of which only one is visible in the view in FIGS. 2a and 2b. An intermediate conveyor 15 may be arranged or positioned in the stationary frame element 11, as shown inter alia in FIG. 7.

Figure 3:
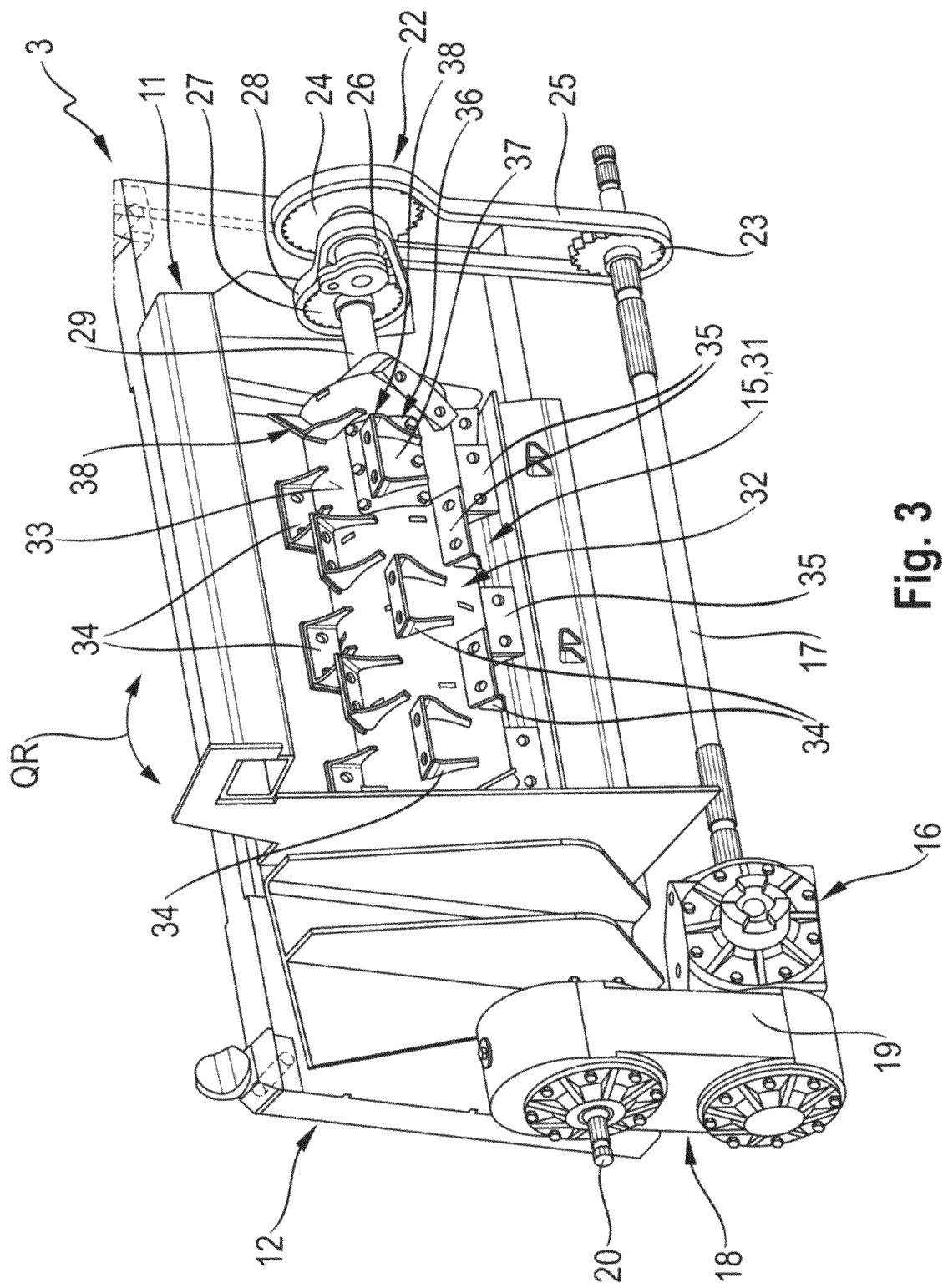
FIG. 3 schematically shows a simplified partial perspective view of the adapter unit from behind.
Figure 4:
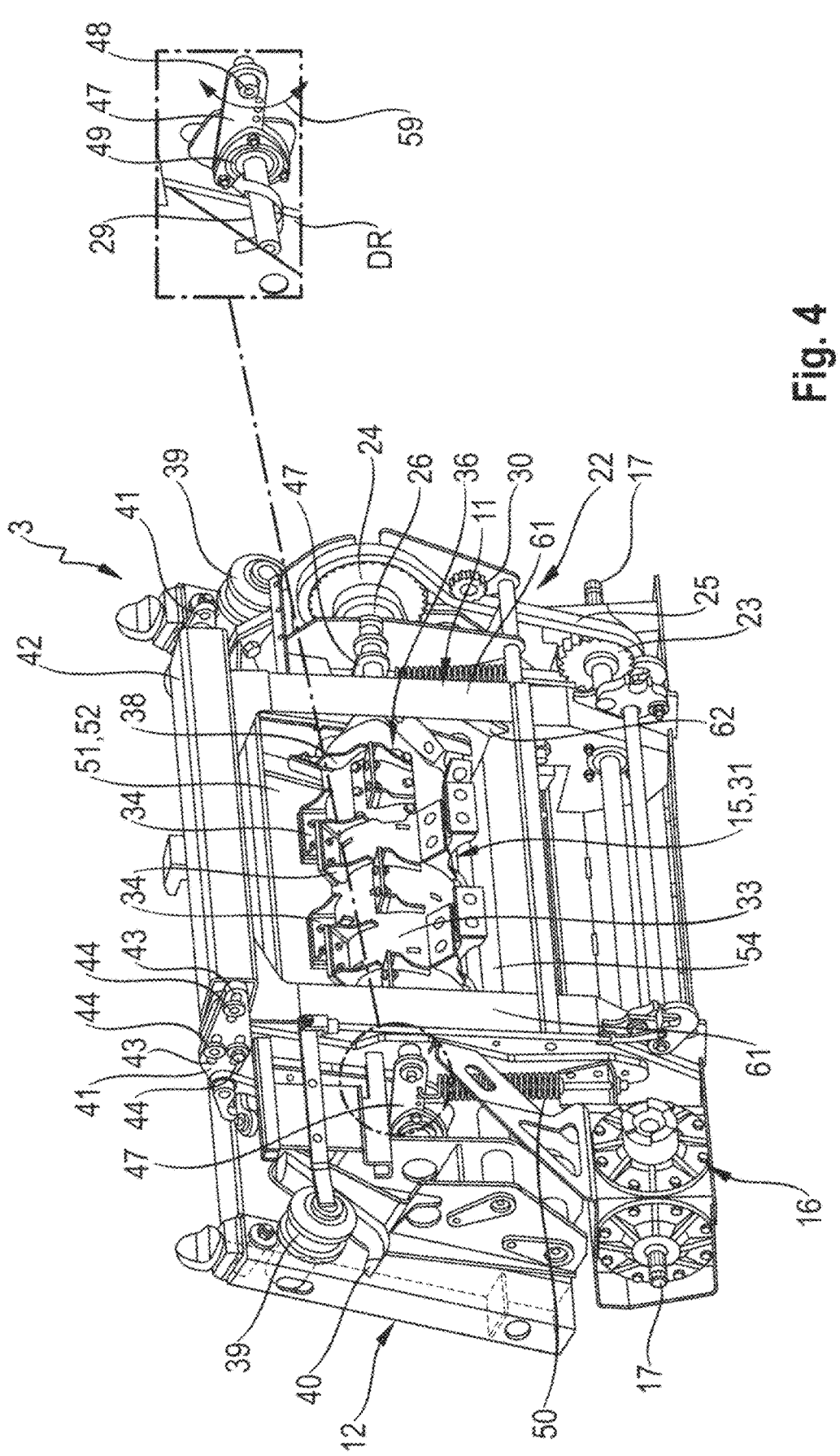
FIG. 4 schematically shows a partial view of the adapter unit from behind.

In one or some embodiments, an angular gear 16 is arranged or positioned on the stationary frame element 11, which may be arranged or positioned in a stationary manner on the mounting device 4, below the intermediate conveyor 15, which angular gear 16 has two coaxial output shafts 17 which serve to drive two gearboxes 18 arranged or positioned opposite one another on the stationary frame element 11, as shown in FIGS. 3 and 4. The two gearboxes 18 may each be arranged or positioned in a housing 19. The respective housing 19 may extend substantially vertically in the direction of the intermediate conveyor 15, starting from the output shafts 17 of the angular gear 16. The respective housing 19 may be fixed to the stationary frame element 11. An output shaft 20 of the respective gearbox 18 extending above and axially parallel to the output shafts 17 of the angular gear 16 may extend outwardly. A drive shaft of the attachment 2 may be coupled to the respective output shaft 20 to drive its components. In one or some embodiments, the two gearboxes 18 may be designed as spur gearboxes.

FIG. 3 schematically portrays a perspective view of the adapter unit 3 from the rear. In one or some embodiments, the intermediate conveyor 15 is driven using a mechanical chain drive 22. As shown in the figures, the chain drive 22 has two stages. In particular, the chain drive 22 may comprise a first stage with two sprockets 23, 24, a lower sprocket 23 and an upper sprocket 24, with different numbers of teeth, which are connected by a drive chain 25. The upper sprocket 24 may drive, using a shaft, another sprocket 26 of the second stage of the chain drive 22. The sprocket 26 may drive, using a drive chain 28, another sprocket 27. The sprocket 27 may be non-rotatably arranged or positioned on a drive shaft 29 of the intermediate conveyor 15. The output shaft 17 of the angular gear 16 may drive the lower sprocket 23 of the first stage, which may be arranged in a rotationally fixed manner thereupon. A chain tensioning device 30, shown as an example in FIG. 4, may generate the chain tension required for the first stage of the chain drive 22, which is illustrated by the indicated deflection of the drive chain 25 in FIG. 3.

In one or some embodiments, the intermediate conveyor 15 is designed as a paddle drum 31. The intermediate conveyor 15 may convey harvested material in an undershot manner (e.g., rotates in a counter-clockwise direction). The paddle drum 31 may comprise a circular cylindrical hollow body 32, which may be arranged or positioned on the drive shaft 29 in a rotationally fixed manner. Over its circumference, the hollow body 32 may have carrier elements 34 distributed on its circumferential surface 33, which carrier elements may extend sectionally in a radial direction beyond the circumferential surface 33 of the hollow body 32. The carrier elements 34 in the inner region of the circumferential surface 33 may be arranged or positioned spaced apart from one another in the axial direction. In the two outer edge regions of the lateral surface 33, carrier elements 38 may be arranged at an angle to the direction of rotation DR, which flank the carrier elements 34 arranged or positioned in the intermediate inner region of the lateral surface 33.

In one or some embodiments, plate-shaped wear elements 35 may be detachably attached to the carrier elements 34 and 38. In one or some embodiments, the wear elements 35 may be attached to the carrier elements 34 by screw connections. The carrier elements 34 may have planar sections on which the wear elements 35 are arranged or positioned. In the axial direction, the planar sections of the carrier elements 34 may extend substantially axially parallel to the longitudinal axis of the hollow body 32. In the radial direction, the planar sections of the carrier elements 34 may be inclined in the direction of rotation DR of the paddle drum 31. Due to the backward inclined arrangement of the carrier elements 34, or respectively of the wear elements 35 fixed thereon, an improved supply of the harvested material to the feed means 5 of the harvester may be achieved. In particular, the carrier elements 34 may be arranged or positioned in a staggered manner when viewed in the circumferential direction. The planar sections of the carrier elements 38, which also serve to receive a wear element 35, may have an inclination directed from the outside inwards towards the center of the through-hole 51 (or other type of passage) of the stationary frame element 11. The inclined carrier elements 38 may allow the harvested material located in the adapter unit 3 to be actively carried along by the paddle drum 31 also in the edge regions, and at the same time conveyed inwards towards the center of the through-hole 51 in the stationary frame element 11.

Figure 8:
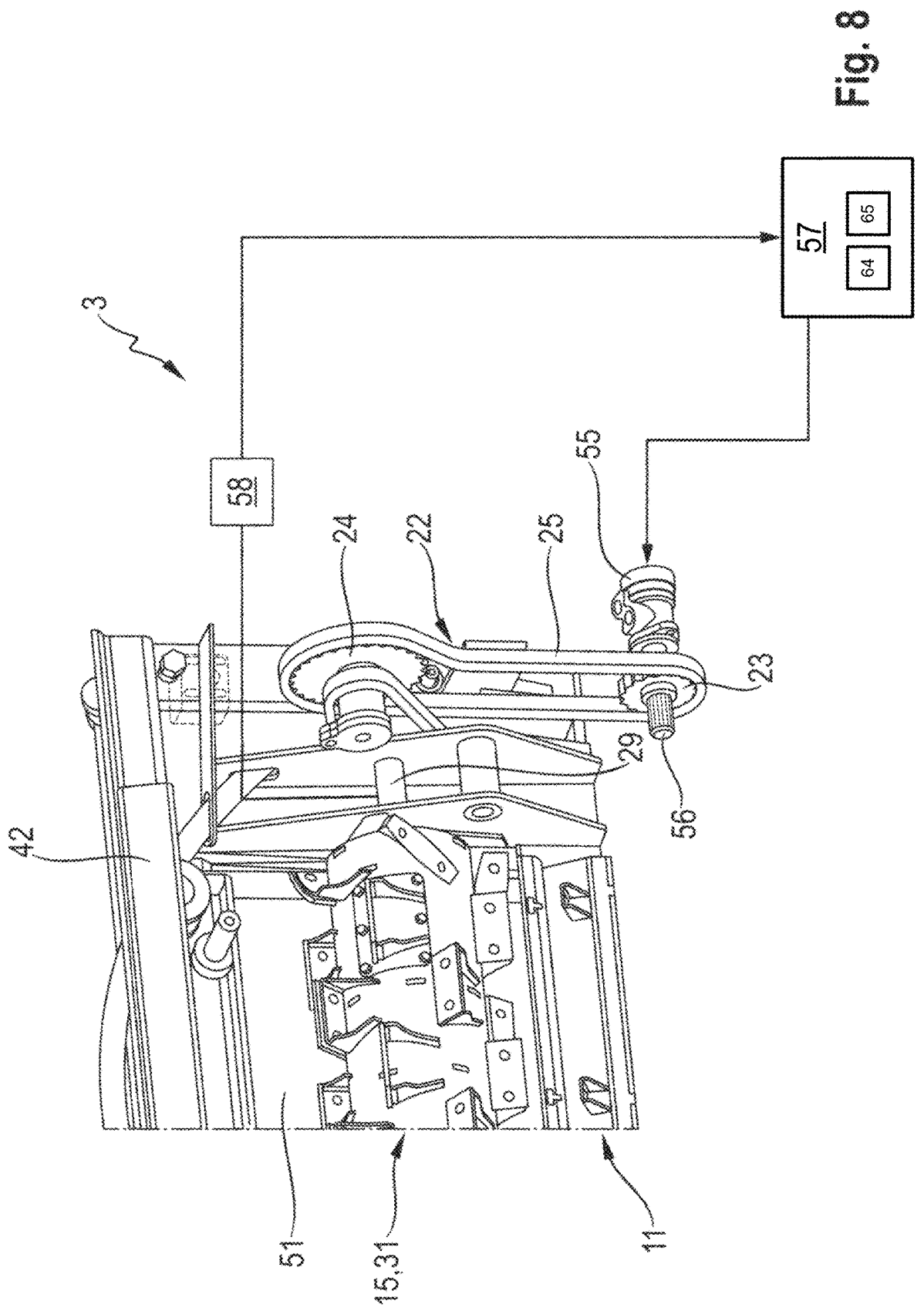
FIG. 8 shows a partial view of the adapter unit from behind with a hydraulic drive of an intermediate conveyor.
Figure 9:
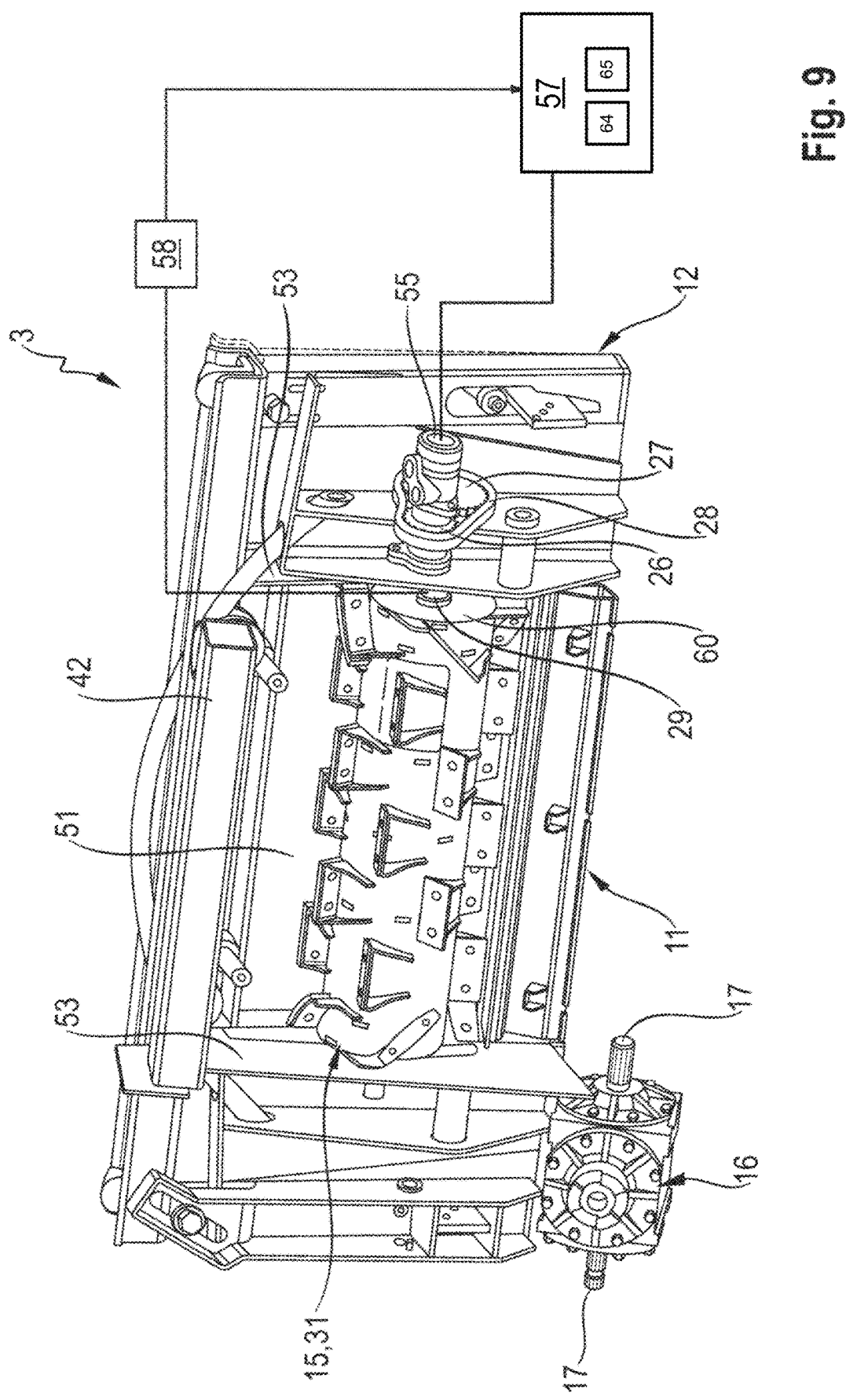
FIG. 9 shows a partial rear view of the adapter unit with a hydraulic drive of the intermediate conveyor according to a further embodiment.
Figure 10:
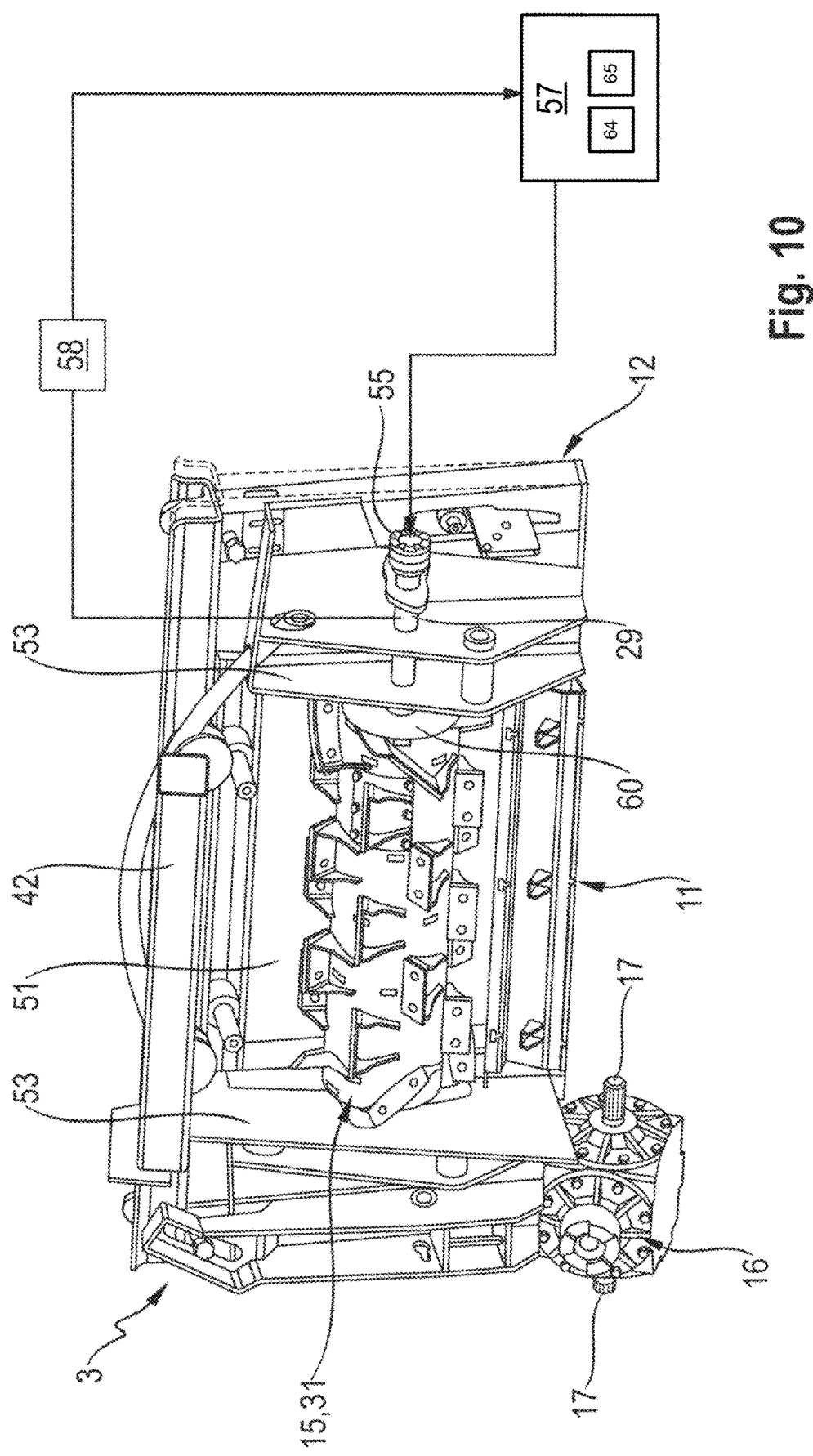
FIG. 10 shows a partial view of the adapter unit from behind with a direct hydraulic drive of the intermediate conveyor.

In one or some embodiments, the detachably attached plate-shaped wear elements 35 may be adapted to different harvesting conditions. Therefore, when harvesting types of crops that have a low abrasiveness, wear elements 35 that are made of a less expensive material may be used. Accordingly, when harvesting types of crops having a high abrasiveness, wear elements 35 distinguished by a higher wear resistance may be used. In order to adjust the rotational speed of the intermediate conveyor 15, the purely mechanical drive of the intermediate conveyor 15 may require the exchange of the sprockets 23, 24 and/or 26, 27 in order to set different transmission ratios. In FIGS. 8-10, alternative embodiments for driving the intermediate conveyor 15 are shown, which are described further below.

In one or some embodiments, the carrier elements 34 may be non-detachably connected to the circumferential surface 33 of the hollow body 32, for example by a welded connection. In order to simplify the assembly and disassembly of the paddle drum 31, at least one overhaul element 36 detachably arranged or positioned on the lateral surface 33 may be provided. The at least one overhaul element 36 may be detachably fixed to the circumferential surface 33 using a substantially cuboidal bottom plate 37, such as by using screw connections. A carrier element 34 may be welded onto the bottom plate 37 (or base plate) of the overhaul element 36 and may support a wear element 35. By detaching the at least one overhaul element 36 from the circumferential surface 33, the interior of the paddle drum 31 is accessible in order to detach fastening means inside the paddle drum 31 from the drive shaft 29. The paddle drum 31 may then be pulled out of the stationary frame element 11.

The individual carrier elements 34, 38 themselves may have a smooth outer edge shape, or may be formed with a plurality of serrated or U-shaped outer edges that may more optimally grip the various types of harvested material. In this regard, the carrier elements 34, 38 may be arranged or positioned with a uniform edge shape on the paddle drum 31 or in combination with other edge shapes to optimize the flow of harvested material.

Figure 5:
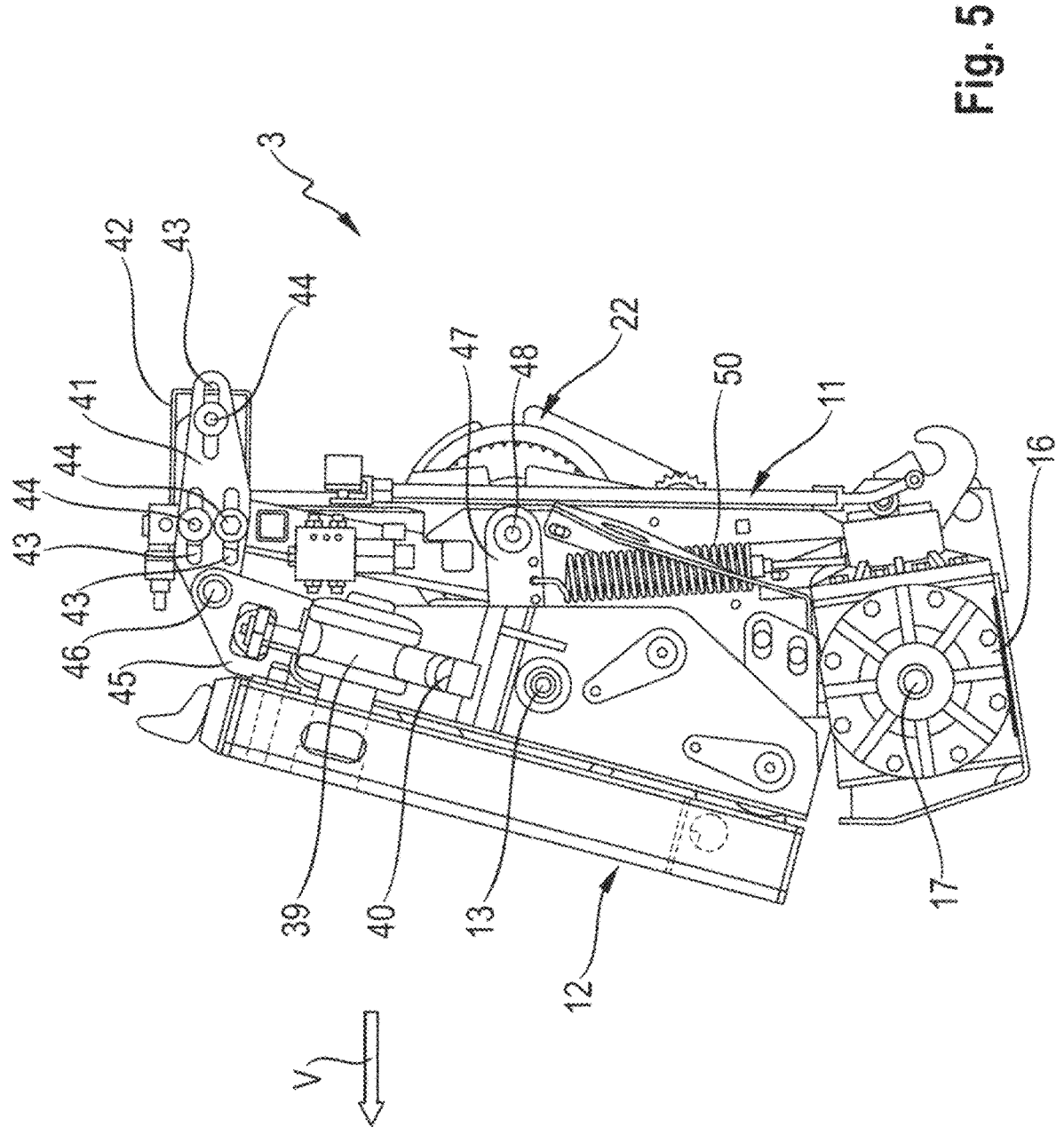
FIG. 5 schematically shows a partially cut-out side view of the adapter unit.

The illustration in FIG. 4 schematically shows a partial rear view of the adapter unit 3. FIG. 5 schematically shows a partially cut-out side view of the adapter unit 3. FIGS. 4 and 5 illustrate further constructional details of the adapter unit 3 which are not shown or visible in the preceding FIGS. 2a-b and 3.

The illustration in FIG. 4 therefore shows that at least two rollers 39 are arranged or positioned opposite each other on the relatively movable frame element 12 in the outer edge region, which rollers are supported on correspondingly designed guide elements 40 on the stationary frame element 11. The rollers 39 guided by the guide elements 40 may enable the relatively movable frame element 12 to oscillate about the virtual pendulum axis 21 in the transverse direction QR. The inclination in transverse direction QR may be adjustable within a predetermined range (e.g., a range substantially between ±3.5°; a range substantially between ±4.0°; a range substantially between ±4.5°; a range substantially between ±5.0°). The maximum angle of inclination in the transverse direction QR may be predetermined by the geometry of the guide elements 40. In principle, a value deviating therefrom for the range of the inclination of the relatively movable frame element 12 in the transverse direction QR, a larger or a smaller value, is contemplated.

In the illustrated embodiment, the inclination in the longitudinal direction LR may be limited by lever arms 41 displaceably arranged or positioned on both sides of the upper, horizontally extending, frame section 42 of the stationary frame element 11. The lever arms 41, which may be arranged or positioned parallel to one another, may extend in the forward travel direction V starting from the upper frame section 42. The particular lever arm 41 may have elongated holes 43, through each of which an axially secured bolt 44 extends. An end of the lever arm 41 facing the relatively movable frame element 12 may be hinged to an upper frame portion 45 of the relatively movable frame element 12 so as to pivot about an axis 46. The elongated holes 43 may limit the longitudinal movement of the lever arm 41, and therefore the inclination of the relatively movable frame element 12 in the longitudinal direction LR, substantially to the range between ±4°. It is contemplated that a larger or a smaller value deviating therefrom for the range of between ±4° of the inclination of the relatively movable frame element 12 in the longitudinal direction LR.

The detailed view according to FIG. 4 illustrates a lever arm 47 which may be floatingly mounted about a pivot axis 48 in one of the side walls 14 of the relatively movable frame element 12. At the free end of the lever arm 47, a bearing point 49 may be arranged or positioned in which the drive shaft 29 of the intermediate conveyor 15 is rotatably mounted. Depending on the amount of supplied harvested material, the intermediate conveyor 15 may experience a deflection (see arrow 59) in the vertical direction. For this purpose, two lever arms 47 may be provided which may guide the intermediate conveyor 15 in a pivotable manner about the pivot axis 48.

As may be seen from FIG. 5, a tension spring 50 may engage the particular lever arm 47. The spring force of the tension spring 50 may cause a resetting of the lever arms 47, or respectively the intermediate conveyor 15 when the supplied amount of harvested material again decreases. The intermediate conveyor 15 may be deflected sectionally both upwards and downwards using the lever arms 47, which may be pivotably mounted about the pivot axis 48. On the opposing side walls 53 of the stationary frame element 11, arced recesses 48a (see FIG. 7) or elongated holes may be provided, within which the drive shaft 29 of the intermediate conveyor 15 may be movable in the vertical direction.

Figure 6:
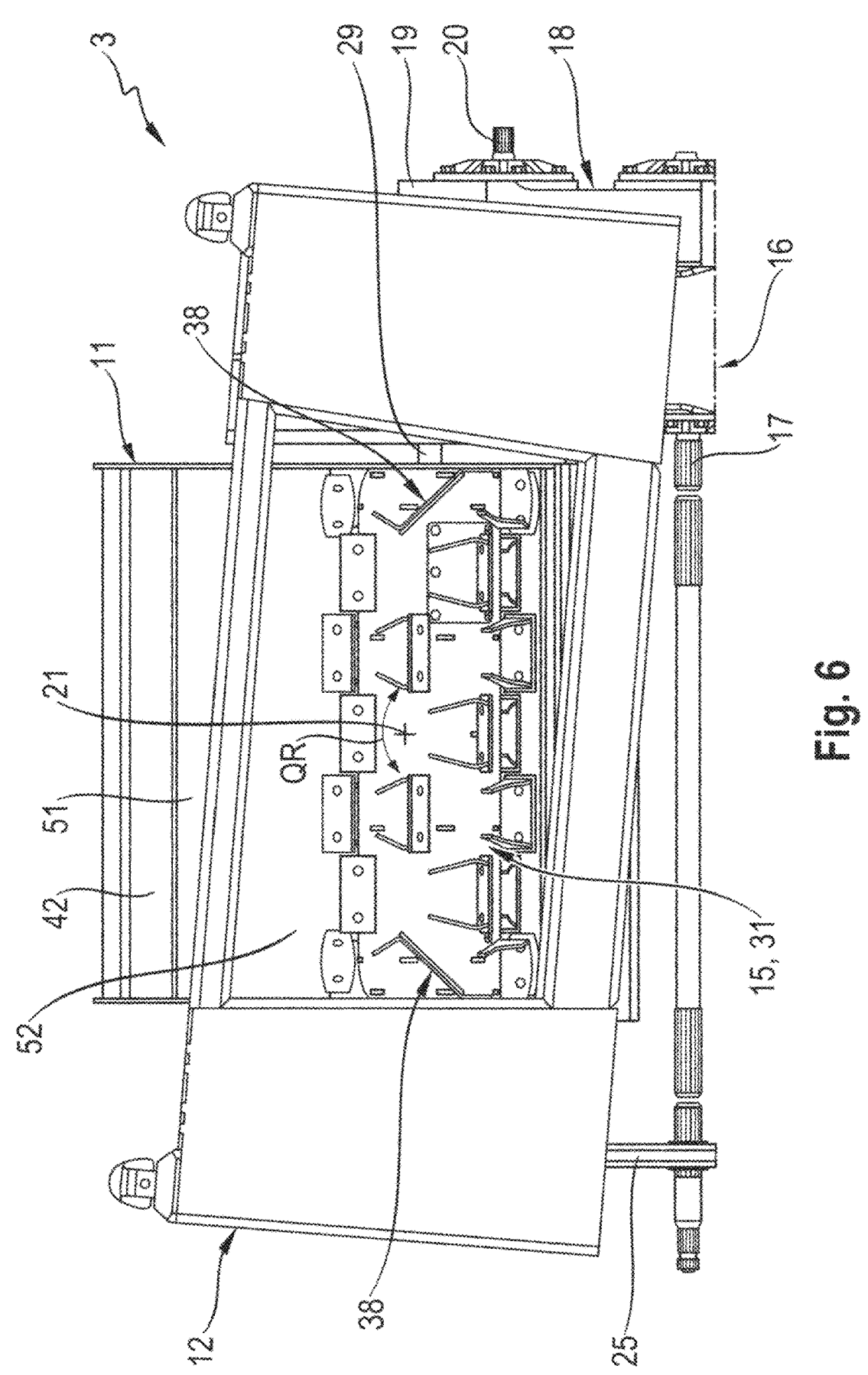
FIG. 6 schematically shows a simplified front view of a relatively movable and stationary frame element of the adapter unit.

In FIG. 6, a simplified front view of the stationary frame element 11 and the relatively movable frame element 12 of the adapter unit 3 is schematically shown. The stationary frame element 11 may have a substantially cuboidal (or cuboid-shaped) through-hole 51, while the relatively movable frame element 12 has a substantially trapezoidal through-hole 52 (or other type of passage). In particular, the trapezoidal through-hole 52 may exhibit a course widening from the bottom to the top. In one or some embodiments, the trapezoidal through-hole 52 has an opening cross-section which may substantially correspond to that of the outlet opening 8 in the frame of the attachment 2. This makes it possible to avoid the harvested material coming from the attachment 2 having to be compacted towards the center in the adapter unit 3, as may be the case with an adapter having an opening cross-section adapted to the working width of a forage harvester. By avoiding additional compaction of the harvested material in the adapter unit 3, the generation of increased pressure and friction and therefore deterioration of the supply of harvested material is reduced or minimized. The carrier elements 34 and the carrier elements 38 may extend at least across the width of the through-hole 52 of the relatively movable frame element 12, whereby regions without active engagement by the paddle drum 31 may be largely avoided.

In order to ensure an optimum supply of harvested material from the attachment 2 into the harvester 1 irrespective of the type of harvester, the axial extension of the intermediate conveyor 15 may approximately be adapted to the working width of the mounting device 4, a so-called inclined conveyor, of a combine, which may be greater than 1 m, such as greater than 1.5 m. The working width of the mounting device 4 of a harvester 1 designed as a forage harvester, a so-called feed channel, may be less than 1 m.

Figure 7:
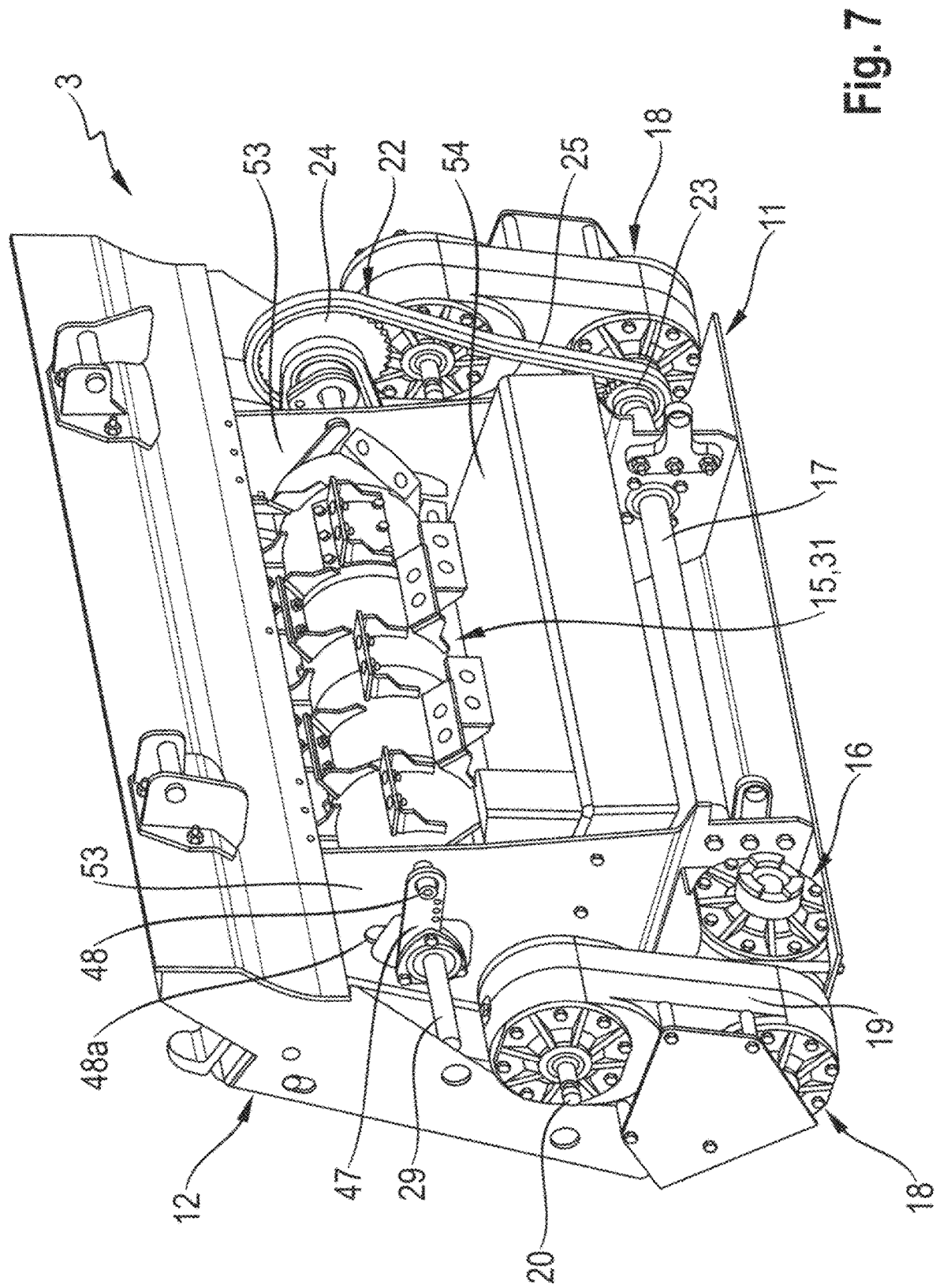
FIG. 7 schematically shows a partially cut-out, perspective view of the adapter unit from behind.

FIG. 7 schematically portrays a perspective view of the adapter unit 3 from the rear. Axial end faces 60 of the intermediate conveyor 15, or respectively the paddle drum 31, may be delimited by side walls 53 of the stationary frame element 11. For this purpose, the paddle drum 31 may have an axial extension such that a minimum axial distance is established between the side walls 53 and the axial end faces 60 of the intermediate conveyor 15. The adapter unit 3 may have a feed floor 54 extending below the intermediate conveyor 15 and may be formed between a delivery region in front of the outlet opening 8 of the attachment 2 and a receiving region below the feed means 5 with a substantially stepless transition, or a transition adapted to the inclination of the delivery area and receiving area due to the design.

The side walls 53 may extend vertically to the upper frame section 42 of the stationary frame element 11. In the direction of conveyance of the harvested material, the side walls 53 may extend substantially over the extent of the feed floor 54. In one or some embodiments, the diameter of the enveloping circle of the paddle drum 31 may be designed such that the radial distance to the feed floor 54 is minimized. The minimized distances of the axial end faces 60 of the paddle drum 31 to the side walls 53 may minimize the gap between the stationary frame part and the axial end faces 60 of the paddle drum 31. The small distance of the paddle drum 31 to the feed floor 54 and the protected gap between the stationary frame element 11 and the axial end faces 60 of the paddle drum 31 may keep the harvested material to be conveyed under the paddle drum 31 and prevent or minimize deposits around the drive shaft 29.

The through-hole 51 may be narrowed by frame segments 61 extending substantially in the vertical direction, as shown in FIG. 4. In order to direct the undershot material flow, guide elements 62 are provided that start from the feed floor 54 and extending sectionally in the vertical direction, and are arranged or positioned on the inside of the two frame segments 61. With respect to the conveying direction, the guide elements 62 may taper towards the through-hole 51. In addition, the guide elements 62 may have an inclination with respect to the feed floor 54. In this respect, the guide elements 62 may be inclined in the direction of the side walls 53 starting from the respective frame segment 61 on which they are arranged or positioned.

The illustration in FIG. 8 shows a partial rear view of the adapter unit 3 with a hydraulic drive for indirectly driving the intermediate conveyor 15. According to this embodiment, the two-stage chain drive 22 is driven by a hydraulic motor 55 as a hydraulic drive. When the torque or speed requirements of the intermediate conveyor 15 require transmission by a first stage of the chain drive 22, the hydraulic motor 55 may be positioned above the lower main drive train (e.g., one of the output shafts 17 of the angular gear 16) on the stationary frame element 11. The hydraulic motor 55 may provide the input speed or input velocity of the first stage of the chain drive 22, but with the ability to set a variable or fixed speed.

The hydraulic motor 55 may drive the shaft 56 of the first stage independently of the angular gear 16 or gearboxes 18 by which the attachment 2 is driven. For this purpose, the hydraulic motor 55 may be drivingly connected to the shaft 56 of the first stage, which may comprise the two sprockets 23, 24. A control unit 57 may be provided for actuating the hydraulic motor 55. The control unit 57 may be arranged or positioned on the harvester 1 and may be operated from the operator's cab using an input-output unit. In one or some embodiments, the control unit 57 may actuate other working units of the harvester.

The control unit 57 may comprise any type of computing functionality, such as at least one processor 64 (which may comprise a microprocessor, controller, PLA, or the like) and at least one memory 65. The memory 65 may comprise any type of storage device (e.g., any type of memory). Though the processor 64 and the memory 65 are depicted as separate elements, they may be part of a single machine, which includes a microprocessor (or other type of controller) and a memory. Alternatively, the processor 64 may rely on memory 65 for all of its memory needs.

The processor 64 and memory 65 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The working elements to be controlled may include, inter alia, the feed means 5 of the harvester 1. A further working element when a harvester is designed as a forage harvester is a chopping device 63. In order to achieve an optimum chopping length or chopping quality, the drive speed of the chopping device 63 may be variably preset and may also be adjusted during the chopping process. The drive speed of the chopping device 63 may also be adapted through an actuation by the control unit 57. The variable adaptability of the drive speed of the intermediate conveyor 15 makes it possible to control or regulate it in such a way that the drive speed of the intermediate conveyor 15 may follow, such as directly, a change in the drive speed of the feed means 5 and/or the downstream chopping device 63. Therefore, a change in the drive speed of the chopping device 63 may automatically lead to a change in the drive speed of the intermediate conveyor 15. In this way, an optimal feeding of the harvested material by the intermediate conveyor 15 may be ensured. Using the control unit 57, the volume flow supplied to the hydraulic motor 55 may be controlled or regulated.

In one or some embodiments, the hydraulic motor 55 may operate the intermediate conveyor 15 in a stepless speed range between a minimum value and a maximum value. This may eliminate the need to replace the sprockets 23, 24 of the first stage or the sprockets 26, 27 of the second stage in order to adjust the speed of the intermediate conveyor 15, or respectively the paddle drum 31.

The second stage of the chain drive 22 may remain unchanged, so that the floating bearing of the intermediate conveyor 15 may be maintained. In addition, the second stage may be designed with a shear pin or shear pin or a coupling device as an overload protection device. Using the overload protection device, the intermediate conveyor 15 as well as its drive means may be protected against an overload if, for example, a large foreign body enters the adapter unit 3 or a blockage occurs.

Another advantage of the hydraulic drive arrangement of the adapter unit 3 is the possibility to use several types of attachments with different feeding characteristics. Depending on the type and brand of the attachment 2 which feeds the harvested material into the adapter unit 3, it may be necessary to adapt the intake speed at which the harvested material is fed to the feed means 5. With a continuously adjustable rotational speed of the intermediate conveyor 15, or respectively the paddle drum 31, the flow of harvested material may be adapted for different picking-up characteristics of the attachment 2 and/or to different harvesting conditions.

In connection with the floating mounting of the intermediate conveyor 15, as described above, at least one sensor 58 may be arranged or positioned on the adapter unit 3, which may be configured to detect the deflection of the intermediate conveyor 15 as a function of the conveyed mass flow of the crop. The signal generated by the at least one sensor 58 may be transmitted (e.g., wired and/or wirelessly) to the control unit 57 and evaluated by the latter. For example, the control unit 57, responsive to receiving the signal indicating the deflection of the intermediate conveyor 15, may control (such as by sending one or more commands) at least one aspect of the intermediate conveyor 15. The at least one sensor 58 may, for example, be designed as a rotary potentiometer which detects the pivoting movement of one of the levers 47. By evaluating the signal of the at least one sensor 58, the control unit 57 may conclude the amount of crop that is fed to the intermediate conveyor 15 and, depending thereon, adjust the rotational speed of the intermediate conveyor 15 and/or the paddle drum 31, respectively.

The illustration in FIG. 9 shows a partial view of the adapter unit 3 from behind with the hydraulic drive of the intermediate conveyor 15 according to another embodiment. According to this embodiment, a two-stage design of the chain drive 22 is dispensed with. The chain drive 22 may comprise only the second stage already described above, which may be formed by the sprocket 26, the drive chain 28 and the additional sprocket 27. The sprocket 27 may be non-rotatably arranged or positioned on the drive shaft 29 of the intermediate conveyor 15. The sprocket 26 may be non-rotatably arranged or positioned on an output shaft of the hydraulic motor 55, which directly drives the sprocket 26. The hydraulic motor 55 may be controlled in this case in the same manner as described with regard to the preceding embodiment by the control unit 57.

When using the hydraulic motor 55 as a direct drive of the second stage of the chain drive 22, a pressure relief valve and/or accumulators of a hydraulic supply system of the harvester 1 may be used to protect the intermediate conveyor 15, or respectively the paddle drum 31. To allow for a faster response, the pressure relief valve and/or accumulators may also be arranged or positioned on the hydraulic motor 55 itself.

In FIG. 10, a partial rear view of the adapter unit 3 is shown with a direct hydraulic drive of the intermediate conveyor 15 paddle drum 31. In contrast to the two preceding embodiments of the hydraulic drive, the hydraulic motor 55 may directly drive the drive shaft 29 of the intermediate conveyor 15. The hydraulic motor 55, which is non-rotatably connected to the drive shaft 29 may, together with the paddle drum 31, undergo deflection in the vertical direction upwards and downwards depending on the supplied amount of harvested material. As explained above, the deflection in the vertical direction may be limited by an arced recess 48a.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Harvester
2 Attachment
3 Adapter unit
4 Mounting device
5 Feed means
6 Feed roller
7 Feed roller
8 Outlet opening
9 Hydraulic cylinder
10 Opening
11 Frame element
12 Frame element
13 Pivot axis
14 Side wall
15 Intermediate conveyor
16 Angular gear
17 Output shaft
18 Gearbox
19 Housing
20 Output shaft
21 Pendulum axis
22 Chain drive
23 Sprocket
24 Sprocket
25 Drive chain
26 Sprocket
27 Sprocket
28 Drive chain
29 Drive shaft
30 Change tensioning device
31 Paddle drum
32 Hollow body
33 Circumferential surface
34 Carrier element
35 Wear element
36 Overhaul element 37 Base plate
38 Carrier element
39 Roller
40 Guide element
41 Lever arm
42 Frame section
43 Slot
44 Bolt
45 Frame section
46 Axis
47 Lever arm
48 Pivot axis
48a Recess
49 Bearing point
50 Tension spring
51 Through-hole
52 Through-hole
53 Side wall
54 Feed floor
55 Hydraulic motor
56 Shaft
57 Control unit
58 Sensor
59 Deflection
60 Axial end face
61 Frame segment
62 Guide element
63 Chopping device
64 Processor
65 Memory
DR Rotation direction
LR Longitudinal direction
QR Transverse direction
V Forward direction of travel

The invention claimed is:

1. A self-propelled harvester comprising:
a mounting device comprising a feeder for harvested material and configured to mount an attachment on the harvester;
an adapter unit configured to be detachably positioned between the mounting device and the attachment, wherein the adapter unit comprises a stationary frame element and a relatively-movable frame element movable relative to the stationary frame element, wherein the adapter unit comprises a driven intermediate conveyor which is positioned between an outlet opening of the attachment and an opening of the mounting device; and
an angular gear positioned on the stationary frame element below the intermediate conveyor;
wherein the adapter unit is configured to couple the attachment to the mounting device;
wherein the adapter unit is configured to adjust an inclination of the attachment with respect to the mounting device in a longitudinal direction and a transverse direction relative to a forward direction of travel of the harvester; and
wherein the angular gear includes two coaxial output shafts configured to drive two gearboxes positioned opposite one another on at least one of the relatively-movable frame element or the stationary frame element.

2. The harvester of claim 1, wherein the stationary frame element is configured to affix to the mounting device; and wherein each of the stationary frame element and the relatively-movable frame element has a through-hole.

3. The harvester of claim 1, wherein the relatively-movable frame element is configured to be adjustable in:
the transverse direction about a virtual pendulum axis running in the longitudinal direction of the mounting device; and
the longitudinal direction about a horizontal pivot axis positioned on the stationary frame element and running transversely with respect to a longitudinal axis of the mounting device.

4. The harvester of claim 3, wherein the relatively-movable frame element sectionally encloses the stationary frame element in a region of the horizontal pivot axis.

5. The harvester of claim 4, wherein at least two rollers are positioned opposite one another on the relatively-movable frame element in an outer edge region; and
wherein the at least two rollers are supported on correspondingly designed guide elements positioned on the stationary frame element.

6. The harvester of claim 1, further comprising at least one actuator configured to adjust the inclination of the attachment relative to the mounting device in the longitudinal direction.

7. The harvester of claim 6, wherein the adapter unit is configured to adjust the inclination in the longitudinal direction within a range substantially between ±4°, and configured to adjust the inclination in transverse direction within a range substantially between ±4.5°.

8. The harvester of claim 1, wherein the adapter unit includes a feed floor which extends below the intermediate conveyor and is formed between a delivery region in front of the outlet opening of the attachment and a receiving region below the feeder with a substantially stepless transition or a transition adapted to inclination of the delivery region of the attachment and the receiving region of the feeder.

9. The harvester of claim 1, wherein the intermediate conveyor is configured to float by being adjustable responsive to volume fluctuations in flow of the harvested material supplied by the attachment.

10. The harvester of claim 9, further comprising a control unit configured to variably adapt a drive speed of the intermediate conveyor to a drive speed of one or both of the feeder or a downstream working unit of the harvester.

11. The harvester of claim 10, characterized in that the intermediate conveyor is driven indirectly or directly by a variable-speed hydraulic motor.

12. The harvester of claim 11, wherein operation of the hydraulic motor is independent of drive means for the attachment.

13. The harvester of claim 11, further comprising at least one stage chain drive configured to indirectly drive the intermediate conveyor.

14. The harvester of claim 11, wherein the intermediate conveyor comprises a drive shaft; and
further comprising a hydraulic drive arranged on the drive shaft and configured to directly drive the intermediate conveyor.

15. The harvester of claim 14, further comprising at least one sensor positioned on the adapter unit and configured to detect a deflection of the intermediate conveyor.

16. The harvester of claim 15, further comprising a control unit configured to:
receive an indication of the deflection of the intermediate conveyor; and
control, based on the indication of the deflection of the intermediate conveyor, a rotational speed of the intermediate conveyor by actuating the hydraulic drive.

17. The harvester of claim 1, wherein the two gearboxes are each positioned in a housing which, starting from the output shafts of the angular gear, extend substantially vertically in a direction of the intermediate conveyor; and wherein an output shaft of a respective gearbox extends outward above and axially parallel to a respective output shaft of the angular gear.

18. The harvester of claim 1, wherein the intermediate conveyor comprises a paddle drum.

19. The harvester of claim 18, wherein the paddle drum includes carrier elements arranged in a plurality of rows one behind the other on its circumferential surface at a distance from one another in an axial direction; and wherein the carrier elements are positioned in rows offset from one another in a tangential direction.

20. The harvester of claim 18, wherein at least one overhaul element is detachably positioned on the paddle drum and configured to dismantle the paddle drum.

21. The harvester of claim 20, wherein the at least one overhaul element is detachably fixed to the paddle drum using a substantially cuboid base plate.

22. The harvester of claim 1, wherein the harvester comprises a self-propelled forage harvester; and wherein the harvester is configured, using the adapter unit, to be coupled to the attachment that is designed for arrangement on a self-propelled combine.

23. The harvester of claim 1, wherein the driven intermediate conveyor of the adapter unit is positioned within the stationary frame element.

* * * * *